Aug. 2, 1949.      C. H. ALLEN      2,477,948
SAND SCRUBBER
Filed Oct. 12, 1946      2 Sheets-Sheet 1
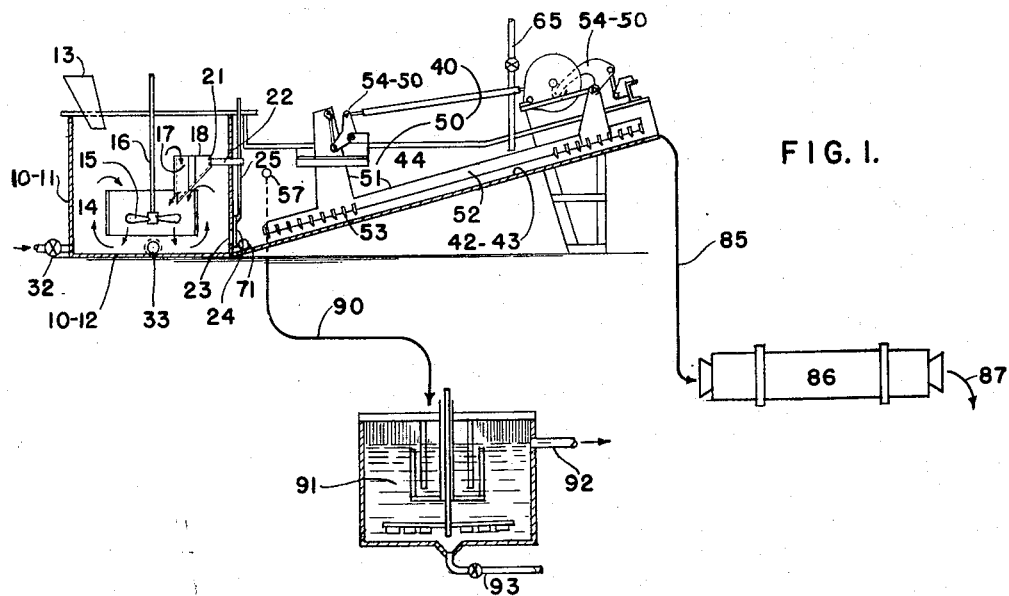
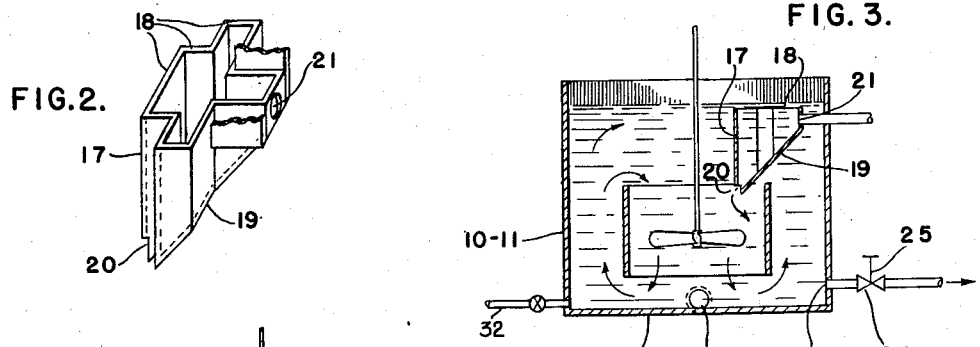
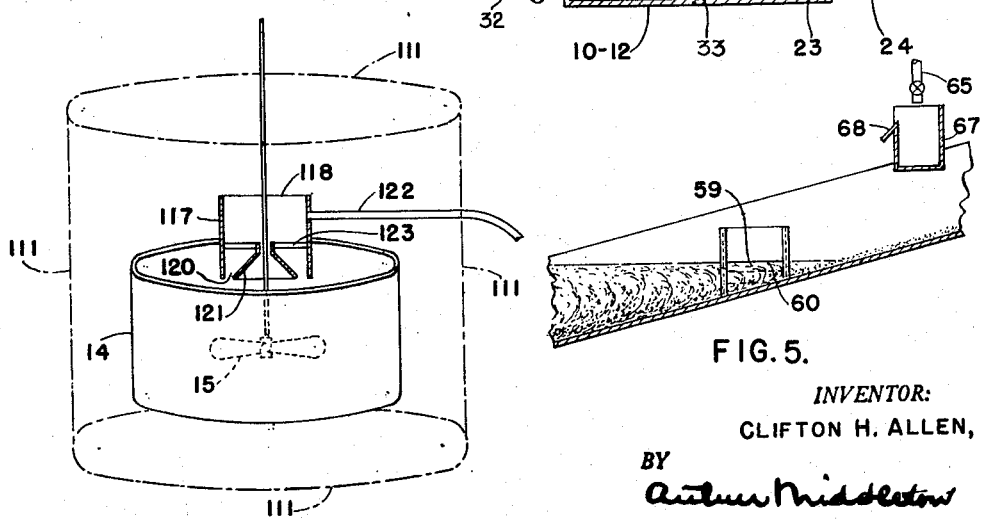
INVENTOR:
CLIFTON H. ALLEN,
BY
Arthur Middleton
ATTORNEY Aug. 2, 1949.

C. H. ALLEN 2,477,948

SAND SCRUBBER

Filed Oct. 12, 1946

INVENTOR:
CLIFTON H. ALLEN,
BY
Austin Middleton
ATTORNEY

Patented Aug. 2, 1949

2,477,948

UNITED STATES PATENT OFFICE 2,477,948

SAND SCRUBBER

Clifton H. Allen, Denver, Colo., assignor to The Dorr Company, New York, N. Y., a corporation of Delaware Application October 12, 1946, Serial No. 702,945

7 Claims. (Cl. 241—68)

This invention relates to a method of and apparatus for the treatment of suspended solids for the removal by scrubbing of incrustations or other contaminants thereon. Such solids may be crystals of various kinds, cinders or sand. More particularly the invention has to do with the scrubbing of sand and especially foundry sand that has been used and is to be reclaimed. Grains of used foundry sand have coatings of fine black carbon and other refuse or residues of the metal casting operations which normally render such grains incapable of re-use. The coatings comprise carbon particles resulting from the breakdown of coal, oil and organic binder and are very difficult to scrub or otherwise remove from the sand grains.

So one object of this invention is to devise ways and means for the satisfactory economic removal of such coatings. In many foundries, the cost of water is expensive enough to make worthwhile reclaiming of the water used in scrubbing the suspended solids, so a further object of this invention is the reclaiming of such water for re-use.

The invention finds embodiment in maintaining a liquid body or pool of contaminated solids in suspension to which such solids are to be fed continually for treatment therein and continually removed hydraulically therefrom to an agitated bath of such removed solids maintained above an inclined deck that passes from submergence in said bath to emergence therefrom. Scrubbing takes place in a liquid body or pool that may be held in a cylindrical or bowl-like vessel while classification of the solids and their scrubbed-off contaminants takes place in the bath that is maintained in what is usually known as a raking classifier. The bowl or vessel is or may be in communication with the classifier. Coarser scrubbed solids are preferably raked from submergence up the inclined deck of the classifier to emergence and to discharge. Fine solids and contaminants rejected from emergence remain in the classifier bath to be overflowed therefrom for waste or for further treatment. It is important to note that the larger solids in being raked up the inclined deck from submergence to emergence leave their contaminants in suspension as they seem to be rolled back into the bath so that the emerged solids emerge as washed solids.

Another object of this invention relates, therefore, to the effective scrubbing of the contaminated solids in the liquid pool or body in the bowl to be accomplished with sufficient force. This scrubbing takes place partly by colliding the suspended contaminated solids and partly by impelling them forcibly against the bottom of the bowl. This results in progressive removal of contaminations, so it is a further object of this invention to discharge from the bowl these removed contaminants substantially as fast as they are separated from the solids they contaminate. It is another object of this invention to elutriate such solids to wash therefrom contaminants which may adhere only loosely thereto after some scrubbing. Such washed-off contaminants and fine solids are removed from the bowl to the bath in the classifier by a flow-path different from the flow-path by which the larger solids are supplied to that bath.

Important features of the method and apparatus by which the objects and aspects of the invention may be realized will more clearly appear from the description which follows, particularly when taken in connection with the accompanying drawings wherein there is indicated or shown in illustrative detail and cooperative arrangement certain parts or instrumentalities leading to an embodiment for the successful performance of the invention.

Said accompanying drawings constitute a part of this specification and a brief description of the several figures thereof is as follows:

Fig. 1 is a diagrammatic view or flow-sheet illustrating important features of a plant adapted for treating used foundry sand and according to which clear or elutriating water is used, dry-cleaned sand is obtained as an end product and water of the process is clarified for re-use. In this figure there is prominently shown as a single piece of apparatus a bowl providing a scrubbing compartment with an agitating and an elutriating means therein, and a classifier for receiving elutriated sands passing thereinto from the bowl and from which washed sands are delivered for subsequent drying and re-use.

Fig. 2 is a perspective view illustrating an elutriating hopper employable in such bowl.

Fig. 3 is a vertical sectional view illustrating a bowl with a special draft tube and agitating means therein and an elutriating hopper positionably associated for cooperative functioning with respect to the draft tube.

Fig. 4 illustrates a modified form of draft tube and elutriating means arrangement, the bowl with which such arrangement is employable being indicated by dot and dash lines.

Fig. 5 is a view for illustrating certain conditions realizable at the portion of the classifier whereat the raked sands emerge from the liquid bath within the classifier.

From a purely apparatus point of view a new form of apparatus for realizing certain important aspects and novel characteristic features for effecting certain novel operative steps is built up and about an apparatus shown in the Kite et al. Patent No. 2,261,390, dated November 4, 1941. However, with respect to the apparatus of that patent, certain structural changes have been made including novel arrangement and employment of other parts or equipment that comprise characterizing features of the new form of apparatus.

In the specification of the Kite et al. patent, reference is made to the Finney Patent No. 1,997,379, granted April 9, 1935. These two patents show the construction of the raking mechanism illustrated herein and the mechanism by which a low forward raking movement is imparted during a raking stroke and also showing how an elevated rearward movement is imparted to the raking mechanism hereof preparatory to its succeeding raking stroke.

Figure 6:
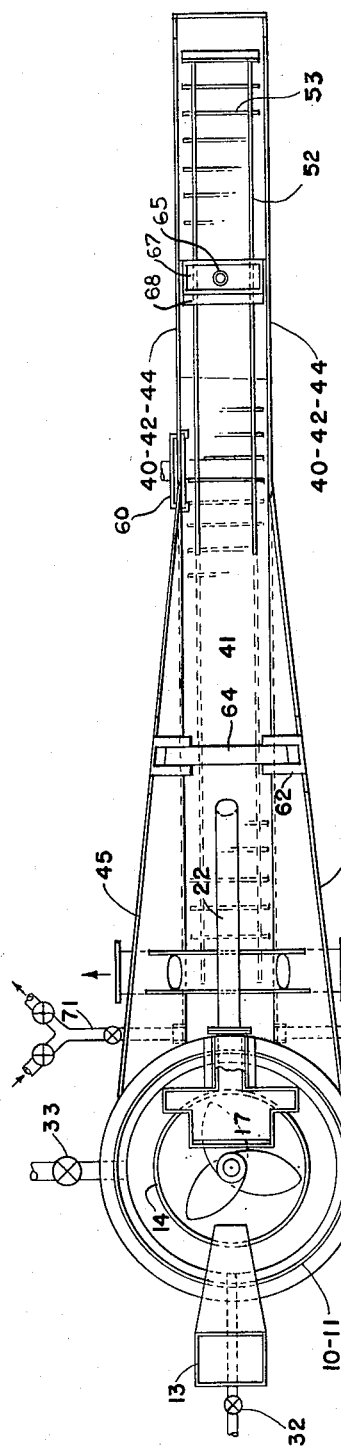
Figs. 6 and 7 are respectively plan and vertical sectional views of a composite bowl or scrubbing compartment and sands classifier for realizing important features of the invention hereof.
Figure 7:
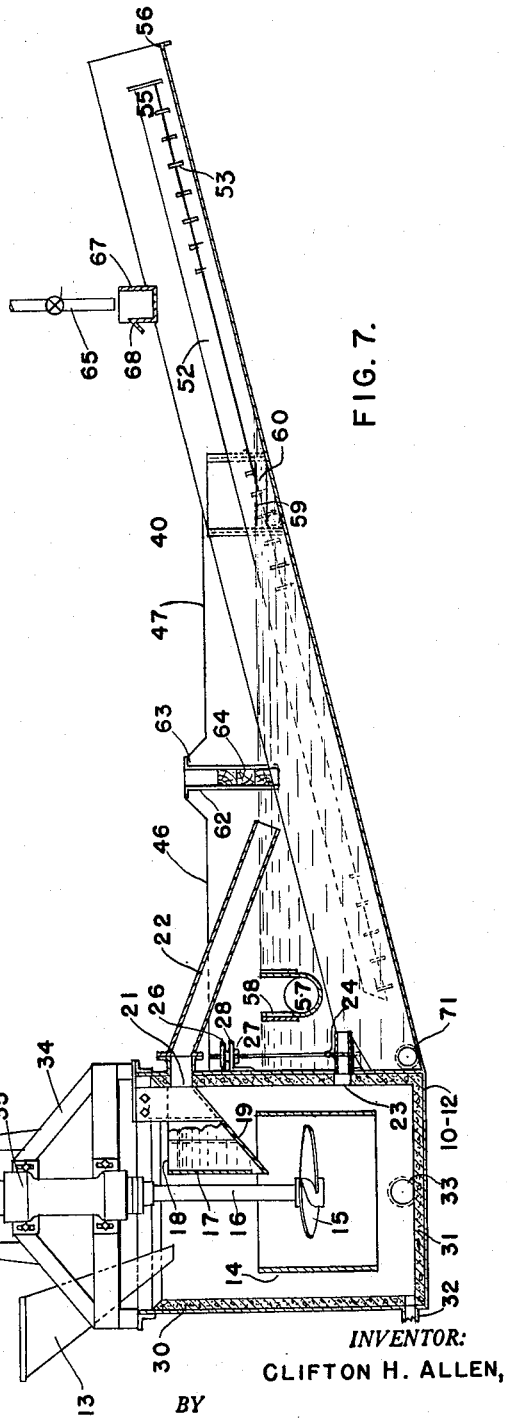

Reference is now made to the drawings in detail:

In Figs. 1, 6 and 7 there is shown a bowl 10 providing a scrubbing basin or compartment having a bottom 12 and a marginal wall 11 rising therefrom. This bowl has therein a draft tube 14 of which the open lower end is vertically spaced a short distance from the bottom of which the open upper end is located, for example, about midway of the height of the bowl interior. In this draft tube there is a bladed impeller 15 preferably of the propeller type, for imposing on the liquid therein a forcible downward thrust on the materials within the draft tube. This impeller 15 is located at the lower end of the vertically-extending shaft 16, the latter of which is actuatable in any suitable manner. Also within the bowl there is an elutriating means which in the forms shown in Figs. 1, 2, 3, 6 and 7 is in the form of an open top elutriating hopper or tank 17 providing therein a settling or elutriation chamber. The upper edge portion of this hopper provides horizontal overflow weir portions or inflow weir edge 18 and past which liquid from within the bowl overflow into the hopper. This hopper has an inclined floor or downwardly sloping bottom 19 and a lowly disposed restricted solids-discharge passageway or opening provided at 20 and positioned for directing solids passing from the elutriating hopper into the draft tube 16, to wit, in a region overlying the impeller 15. It will be noted that this solids-discharge passageway 20 is at elevation proximate but preferably below that of the upper edge of the draft tube. As to the overflow weir portion or upper edge 18 of the hopper, this is at elevation substantially higher than that of the upper edge of the draft tube but lower than that of the top marginal edge of the bowl 10. This hopper 17 has a liquid outflow passageway 21 leading from the upper interior portion thereof and from this opening liquid with washed sands therein, to wit, a liquid fine solids mixture, is discharged through a pipe or conduit means 22 into a raking and washing compartment 41 provided in classifier 40 which is hereinafter described more in detail. This conduit means 22 may be referred to as a settling or elutriation chamber overflow. This pipe 22 provides a gravity outflow means leading from the upper interior portion of the hopper.

The bowl 10 also has a passageway or opening 23 leading through the marginal wall and providing communication between the bowl on the one hand and a bath-holding portion of the classifier 40 on the other hand. The effective area through this passageway 23 is controlled by a gate or movable valve member 24 positionable by a rod 25. Thusly, the passageway 23 serves as means for permitting the passage of a controlled quantity of underflow from the lower portion of the bowl into the classifier. This underflow includes elutriated and scrubbed sands submergedly passing from the bowl. Further describing the bowl construction, it has a feed launder or hopper 13 by which used or dirty solids are introduced into the scrubbing compartment.

In apparatus for treating used foundry sands, it is advisable to have the interior of the bowl 10 lined with metal or other abrasion resisting lining. A lining of such material is provided in the apparatus of Figs. 6 and 7 by a bottom lining section 31 and a wall lining section 30. Also because of the abrasive character of such sands, it is advisable to have the impellers covered with rubber or like abrasion resisting material. Furthermore, it may be advisable to cover the draft tube with rubber or to provide the same with a rubber lining. A valve-controlled wash-water or dilute water supply pipe 32 leads into the lower interior portion of the bowl. Also a valve-controlled drain pipe 33 leads from the lower interior portion of the bowl. There is a supporting frame structure collectively designated as 34, see Fig. 7, which is cooperatively positioned and associated with the bowl. To and by this frame there is connected and carried a frame supported bearing member 35 for the shaft 16. Also by the frame there is carried a motor 36 and housing for power transmission gearing 37, which gearing is disposed between the rotor of the motor on the one hand and the shaft 16 on the other.

As to the classifier 40 this is indicated in operative association and fixed relationship with respect to the bowl whereby the classifier and bowl constitutes a single or unitary structure.

The classifier 40 has an upwardly and forwardly inclined deck section 42 providing a floor or deck 43 and parallel side wall sections 44—44 which in length are practically co-extensive with the deck 43. These side wall sections have outwardly and upwardly diverging lateral portions 45—45 which in plan view provide a forwardly tapering liquid-holding section of which the forward end in transverse dimension is equal to that of the distance between the parallel wall sections 44—44. The upper marginal limits of the lateral portions 45—45 are indicated by horizontal lines 46 and 47. The ends of the side walls of the classifier proper, as well as the floor or deck 43 thereof have liquid-tight connections, made as by welding, to the rising marginal wall or bottom section of the bowl 10, as the case may be, whereby a liquid-tight holding structure results. The liquid-tight holding structure in fact provides that which may be viewed as an open top holding tank constituting a liquid-sands mixture receptacle.

The classifier has as an associated part thereof a raking mechanism which is clearly indicated in Fig. 1 and which is collectively designated as 50. A similarly constructed and functioning mechanism is employed in the classifier construction of Figs. 6 and 7, although only parts thereof are indicated in the last-mentioned figures. This raking mechanism comprises a reciprocatory frame structure 51 embodying longitudinal stringers 52 (extending upwardly and forwardly) and carrying sets of depending transversely-extending raking blades as 53 spacedly disposed throughout their length. A suitably supported and suitably actuated carrying mechanism collectively designated as 54 serves to support the stringers and to move the same and thusly the blades in a low raking position forwardly along the inclined deck or floor portion 43 for effecting a raking operation and for moving the stringers and blades rearwardly along an elevated path preparatory to a successive forward low raking movement. While the rake structures are not shown in Figs. 5 and 6, nevertheless, there has been indicated in said figures a portion of the stringers 52 and of the raking blades 53, to wit, by full lines for a low forward raking position and by dotted lines for an upper rearward non-raking movement.

The classifier construction described may be viewed as embodying a long narrow trough wherein a mass of liquids and solids are received within a deep end rear section thereof. The trough provides that which is herein sometimes referred to as the raking and washing compartment 41 from which washed sands conveyed by the rakes 53 are progressively conveyed upwardly along the floor or deck 43 and ultimately delivered from the upper deck end section 55 past the edge 56 thereof. A raking and washing compartment outflow means, specifically an overflow means 57 is provided for the deep end of the classifier. This outflow means has overflow weir element 58 which is preferably vertically positionable for determining the overflow elevation of liquid with fine washed-out solids therein from the deep end portion of the classifier tank. The overflow elevation of such weir element 58, see Fig. 7, is higher than that of the passageway 23 which may be viewed as a submerged passageway for the elutriated solids and is at elevation approximately that of the passageway or opening 20 leading from the lower portion of the elutriating hopper 17. As previously indicated the passageway or opening 20, and which is sometimes referred to as solids passage area, is provided for delivering elutriated solids from the hopper into the draft tube for repetitive downward scouring movement therethrough. This passageway, opening or area 20 is disposed so as to cause the solids passing therefrom to come within and under the sphere of influence of the liquid being sucked into the upper end of and downwardly with the draft tube 14 as the underlying or lowly disposed impeller 15 functions within the draft tube 14.

The classifier also has an auxiliary overflow means 59 with overflow weir boards 60 preferably adjustable as to height for determining the overflow elevation for liquid with fines and floating organic material therein from an intermediate or more forwardly disposed section of the classifier. This auxiliary overflow means is located in the immediate region whereat the raked sands emerge from the liquid of the bath from which they are raked. The advantageous functioning of the auxiliary overflow at this location will be subsequently described in conjunction with Fig. 5.

A set of longitudinally spaced guide members 62 and 63 is provided on and at side wall of the classifier trough. These spaced guide members are employed for receiving transversely-extending baffle boards 64—64 which collectively constitute an anti-surge baffle construction dipping into the liquid bath within the classifier but not to a depth sufficient to interfere with the movement of the raking structure referred to. These baffle boards lessen the splashing and wave movement particularly for the surface of the bath and also constitute a sufficient division wall between the different portions of the bath whereby floating contaminants in one do not migrate to the other.

A valve-controlled clean-water or wash-water supply pipe as 65 is provided. This pipe 65 delivers the water for sand washing purpose into a transversely-extending distributing trough 67 having an overflow distibuting weir 68 located ahead of the auxiliary overflow.

The classifier has valve- or gate-controlled means 71 leading to or from, as the case may be, each side of a lowermost portion of the classifier whereby according to conditions required said means 71 can be employed for introducing clean or wash water into the lowermost portion of the classifier, or whereby they can be employed for discharging liquid and solids from the lowermost portion of the classifier.

Mention has heretofore been made of the valve 24 and the adjusting stem 25 for controlling the flow area through the opening or passageway 23 leading from the bowl into the classifier.

In Fig. 7 it will be noted that this stem 25 may be adjusted through the medium of nuts 26 and 27 which are on opposite sides of an apertured angle iron 28 that is secured to the marginal wall the bowl 10.

*Modification of Fig. 4*

In Fig. 4 there is illustrated in cooperative arrangement a draft tube 14 with an impeller 15 therein and an elutriating hopper modified as to form from that shown in Figs. 1, 2, 3, 6 and 7. In said Fig. 4 the elutriating hopper or chamber is provided by a small cylindrical tubular wall structure 117 within which there is located a modified cone-shaped member 121 that is supported from the tubular wall 117 by radial bracket members as 123 so as to leave a restricted but open discharge area or annular passageway 120 for permitting the downward passing of elutriated solids into the region within the draft tube that is under the maximum suction influence of the impeller. The elutriating chamber or hopper thus provided is arranged whereby it functions within a bowl in the same manner or in a manner equivalent to that of the functioning of the elutriating hopper 17 and the draft tube 14 in the bowl 10 of Figs. 1, 3, 5 and 6. A gravity flow pipe or conduit 122 serves to convey liquid with fine solids or washed-off contaminants therein from the elutriating chamber 117. This modified form of draft tube and elutriating hopper construction is embodied in a bowl, as bowl 10, of Figs. 1, 2, 3, 5 and 6 the marginal walls and bottom of which are indicated by dot and dash lines 111.

With respect to the classifier shown in Fig. 1, or shown in Figs. 6 and 7, there is indicated in Fig. 5 a portion of the inclined deck in the region whereat the raking mechanism transfers the sand from submergence to emergence. The overflow means 59 with positionable overflow weir boards is located in this region. In this connection according to this figure, it will be noted that fine or even large carbonaceous or other contaminant particles leave the emerging sand and thus solids remain in submergence or suspension whereupon

edge 18 but at elevation substantially higher than that of the upper end of the draft tube. The open top portion of the submerged hopper provides the weir edges 18 which are of substantial extent and over which liquid from within the upper region of the bowl cascades into the hopper.

Within the hopper, a significant sub-elevation of liquid level is maintained due to the suction exerted by the impeller 15 in the region of the restricted outlet 20 of the hopper which restricted outlet has heretofore been described as preferably below the elevation of the upper edge of the draft tube, to wit, at a location wherein it is within the suction effect of the impellers. The sub-elevation maintained in the elutriation hopper is important because it assures flow of liquid into the hopper while at the same time the walls of the elutriation hopper tend to hold back the larger solids from overflowing into the hopper. The downward pull on the liquid-solids content of the hopper 17 as exerted as by the suction imposed thereupon by the impeller ensures and maintains relative quiescence within the hopper 17 as compared with the agitation of the liquid outside of the hopper. This relatively undisturbed condition within the elutriation hopper 17 contributes to the desired elutriation of the heavier gravitating and settling solids in the hopper and to the lagging behind of the suspended fines in the upper region of the hopper and from which region the suspended fines are conducted by the pipe or conduit into the upper portion of the deep end section of classifier 40. Another reason why the fine solids lag behind is that they are subjected to the suction of the impeller in a significantly less degree than the larger solids which in due course pass as discharge from the opening or passageway 20 at the lower end of the hopper. The more or most readily settleable solids are submergedly conducted or conveyed from a lower section of the bowl along the low flow-path 23 into the lower portion of the deep section of the classifier whereat they immediately come under the raking and agitating influence of the reciprocating raking means while the less readily settleable elutriated solids as above mentioned are delivered as solids in suspension into the upper portion of the deep section of the classifier. In the classifier the heavier settling solids are step-by-step movements repetitively raked and thus to a certain extent agitated while being moved upwardly along the floor 43 of the inclined deck 42 to emergence and therefrom along that portion of the inclined deck which is above the general level of the liquid in the classifier until they are ultimately discharged from the final section 55 of the classifier past the high discharge edge 56 thereof. While continuing on the deck portion which is not submerged there is also applied wash water as from pipe 65 which progressively flows downwardly over or from the several and ever-changing piles or hills of raked sand until it becomes part of the liquid-solids mixture in the deeper section of the tank. During the several movements to which the sand is subjected by the raking mechanism while in submergence, there is a progressive and continued releasing from the sands of the finer particles of material entrained therein until the sands are classified whereby they are relatively clear and freed of the finer particles. Upon passing to emergence, the continued action of the raking mechanism tends to dewater the sands, thus delivering a relatively clean, washed and classified product.

The emerged washed solids which are thus delivered from the classifier deck as classified and cleaned sands, are then ready for treatment in a drier or kiln at 86 to render the same ready for use or re-use, for example, as foundry molding sands. As a matter of fact, these sands as they issue from the drier may be rather dark in color particularly if they are recovered foundry sands, but if they are heated or fired to a temperature of 1200° F. or over, they are said to be ignited and issue as fairly white solids.

Water overflowing or passing as outflow from the classifier with its burden of undesirable fine solids and contaminants therein can be treated in suitable means, as for example, in the clarifying tank 91 preferably embodying a flocculating means and a sedimentation section. Chemical supply means may be employed for feeding chemicals to aid or further a coagulating and flocculating of the fines, thus converting the fines of the solids suspension into settleable conditions. In order to do this it may be necessary to supply to the liquid overflowed from the classifier, an electrolyte or flocculating agent whereby the solids suspended therein will become more readily precipitated in the clarifying means. When this outflowing liquid is treated in the flocculating means with movable paddles or blades to effect or further the flocculating operation the speed of the paddles employed for this purpose should proximate 1.2 ft. per second. The resulting floc-laden liquid when subjected to quiescent settling yields a substantially clear supernatant which can be decanted or withdrawn as clarified water suitable for re-use and a mud of fines constituting sediment that collects at the bottom of the quiescent liquid is removed to waste as operative requirements dictate from the bottom as from the bottom of the tank 91 through the valve-controlled discharge conduit 93.

I claim:

1. Apparatus for conditioning sands, comprising a bowl; means for feeding into said bowl sands to be scrubbed and cleaned; means for delivering scrubbing water into the bowl; an open ended draft tube within the bowl spacedly disposed from the bottom and from the marginal wall but of such height that the upper end thereof terminates at an elevation substantially lower than that of the marginal top edge of the bowl; an impeller located within the draft tube; a vertically-extending shaft carrying said impeller; motivated means for revolving said shaft in a direction for forcibly propelling liquid with solids suspended therein in a downward direction; an open top elutriating hopper having a sloping bottom and an uppermost edge at an elevation below that of the marginal wall but higher than that of the upper edge of the draft tube for serving as an overflow weir means that determines the normal operation surface level of the liquid suspension in the bowl, gravity outflow means for the hopper leading from the upper interior portion thereof to a region outside of the bowl, and means providing an elutriated sands-discharge passageway adjacent the lowermost edge of the sloping floor that is located with respect to the draft tube so as to extend thereinto and so as to come under the influence of the operative effect of the impeller; a liquid-suspension receptacle provided outside of the bowl; means leading from the lower interior portion of the bowl into said receptacle for providing a pathway by which washed and elutriated sands are submergedly transferred and delivered from a low portion of the bowl into said receptacle; means for overflowing supernatant liquid with fine suspended solids therein from a portion of said receptacle which is at elevation lower than that of the overflow edges of the elutriating means but higher than that of the elutriated sands-discharge passageway; and means for removing the sands from said receptacle.

2. Apparatus as defined in and by claim 1 and according to which the means for delivering scrubbing water into the bowl includes a valve-controlled pressure-water supply line leading into the lower interior portion of the bowl.

3. Apparatus as defined in and by claim 1, according to which suspension the gravity outflow means for the hopper leads into the upper portion of the liquid suspension receptacle.

4. Apparatus of the character described comprising in operative combination a bowl adaptable for receiving into an upper portion thereof a liquid suspension of contaminated inorganic solids having a bottom and cylindrical wall rising therefrom, a vertical shaft extending downwardly into said tank with an impeller on the lower end portion thereof; means for rotating the impeller; and means providing a gate-controlled passageway for the passage of a controlled quantity of solids-bearing liquid from a lower interior portion of the bowl to the exterior thereof; characterized in that a downflow draft tube is supplied within the tank in position such that the lower open end thereof is spaced above and from the bowl bottom a distance relatively short as compared with that of the vertical distance between the upper end of the draft tube and the higher top edge of the bowl; in that within the bowl there is an open top elutriation hopper having a sloping bottom and side wall sections presenting an inflow weir edge leading into the hopper at elevation lower than that of the top of the bowl but higher than that of the upper end of the draft tube and having an area for discharging elutriated solids into the draft tube whereby such discharged solids come under the influence of downwardly flowing liquid passing into the draft tube, in that the bottom of said hopper slopes downwardly towards said discharge area while providing a boundary portion of the hopper; and in that there is an outflow liquid passageway leading to a region outside of the bowl from elevation within the hopper lower than that of the inflow weir edge at the top of the hopper but higher than that of the area for discharging elutriated solids into the draft tube; said means for rotating the shaft and thereby the impeller being connected and applicable for turning the impeller in a direction for imparting a downwardly acting suction in the draft tube with consequent impelling solids from the draft tube and their solids impingement upon the bowl bottom followed by their reflection upwardly sufficient to re-enter the elutriation hopper for repetitive downflow elutriative treatment therein.

5. Apparatus according to claim 4 in which a fines-overflowing deep end tank with upwardly and outwardly inclined deck section is in direct hydraulic communication through said gate-controlled passage which leads from the lower interior portion of the bowl to discharge into a low portion of the deep end of the tank; which tank has a fines-overflow leading therefrom and is equipped with sands-raking and transfer mechanism functionable for moving settled sands upwardly along the deck ultimately to discharge; said apparatus being characterized in that the outflow liquid passageway leading from the elutriation hopper delivers into the tank at a region structurally ahead of the fines-overflow of the tank.

6. Apparatus according to claim 5, in which the elutriation hopper is circular in plan and is concentric with the vertical impeller shaft as well as the downflow draft tube.

7. Apparatus according to claim 5, in which the elutriation hopper has upwardly-extending side walls provided by a member circular in plan and a bottom conical in vertical cross-section whose outer lower edge portion is circular in plan but of less diameter than that of the lower interior portion of the upright sides provided by a member circular in plan whereby the elutriated solids outflow passage area is annular and delivers the elutriated solids directly within the upper interior portion of the downflow draft tube.

CLIFTON H. ALLEN.

REFERENCES CITED

The following references are of record in the file of this patent:

UNITED STATES PATENTS

| Number | Name | Date |
|--------|------|------|
| 2,071,617 | Daman | Feb. 23, 1937 |
| 2,080,346 | Tainton | May 11, 1937 |
| 2,217,143 | Stevenson | Oct. 8, 1940 |
| 2,331,102 | Bird | Oct. 5, 1943 |
| 2,383,045 | Den Breejen | Aug. 21, 1945 |

OTHER REFERENCES

The Foundry, Apr. 1943, page 68.